(12) United States Patent
Verhaelen et al.

(10) Patent No.: US 12,546,066 B2
(45) Date of Patent: Feb. 10, 2026

(54) SELF-PROPELLED CONSTRUCTION MACHINE

(71) Applicant: Wirtgen GmbH, Windhagen (DE)

(72) Inventors: Philip Verhaelen, Lohmar (DE);
Michael Engels, Montabaur (DE)

(73) Assignee: Wirtgen GmbH, Windhagen (DE)

( * ) Notice: Subject to any disclaimer, the term of this patent is extended or adjusted under 35 U.S.C. 154(b) by 833 days.

(21) Appl. No.: 17/886,272

(22) Filed: Aug. 11, 2022

(65) Prior Publication Data

US 2023/0057136 A1    Feb. 23, 2023

(30) Foreign Application Priority Data

Aug. 19, 2021   (DE) .................... 10 2021 121 583.8

(51) Int. Cl.
*E01C 19/48*   (2006.01)
*E01C 19/00*   (2006.01)

(52) U.S. Cl.
CPC ........ *E01C 19/004* (2013.01); *E01C 19/4893* (2013.01)

(58) Field of Classification Search
CPC ........................... E01C 19/004; E01C 19/4893
USPC ...................................... 404/83–118
See application file for complete search history.

(56) References Cited

U.S. PATENT DOCUMENTS

| 4,003,447 A | 1/1977 | Weyer | |
| 4,140,193 A * | 2/1979 | Miller | B62D 1/28 |
| | | | 172/3 |
| 4,428,450 A * | 1/1984 | Stenstrom | B62D 3/12 |
| | | | 180/428 |

(Continued)

FOREIGN PATENT DOCUMENTS

| CN | 211772640 U | 10/2020 |
| DE | 69216967 T2 | 5/1997 |

(Continued)

OTHER PUBLICATIONS

European Search Report for corresponding patent application No. 22191162.1, dated Jan. 27, 2023, 3 pages (not prior art).

(Continued)

*Primary Examiner* — Raymond W Addie
(74) *Attorney, Agent, or Firm* — Lucian Wayne Beavers; Patterson Intellectual Property Law, PC

(57) ABSTRACT

In a self-propelled construction machine (1), in particular slipform paving machine, comprising
  a machine frame (2),
  at least three travelling devices (14),
  wherein the travelling devices (14) are each connected to the machine frame (2) by means of lifting columns (12),
  wherein at least two of the at least three travelling devices (14) are steerable by means of one each steering drive (6), wherein the respective steering drive (6) comprises at least one first part (10), which is connected to the respective travelling device (14), and one second part (16), which is connected to the respective lifting column (12),
it is provided that the steering drive (6) comprises at least one first toothed rack (22), wherein the first toothed rack is movable by means of at least one first linear drive means (26), wherein teeth of the at least one toothed rack engage with teeth of at least one toothed wheel (17), and the toothed wheel is thus rotatable by means of the movement of the toothed rack.

20 Claims, 10 Drawing Sheets

(56) References Cited

U.S. PATENT DOCUMENTS

| | | | |
|---|---|---|---|
| 5,277,268 A | | 1/1994 | Kuwayama et al. |
| 2015/0083517 A1 | | 3/2015 | Farr et al. |
| 2015/0110589 A1 | | 4/2015 | Kim et al. |
| 2017/0282983 A1 | | 10/2017 | Guntert, Jr. et al. |
| 2020/0208357 A1 | | 7/2020 | Engels |
| 2021/0010211 A1 | * | 1/2021 | Fritz ................ E01C 19/48 |

FOREIGN PATENT DOCUMENTS

| | | | | |
|---|---|---|---|---|
| DE | 10138563 A1 | | 2/2003 | |
| DE | 102014000236 A1 | | 7/2015 | |
| EP | 533179 A1 | | 3/1993 | |
| EP | 2955272 A1 | | 12/2015 | |
| EP | 2955273 A1 | | 12/2015 | |
| EP | 3763877 A1 | * | 1/2021 | ......... E01C 19/4886 |
| EP | 3951062 A1 | * | 2/2022 | ......... E01C 19/4893 |
| WO | 0064700 A1 | | 11/2000 | |

OTHER PUBLICATIONS

China Office Action for corresponding patent application No. 202508210075530, dated Aug. 21, 2025, 2 pages (not prior art).

* cited by examiner

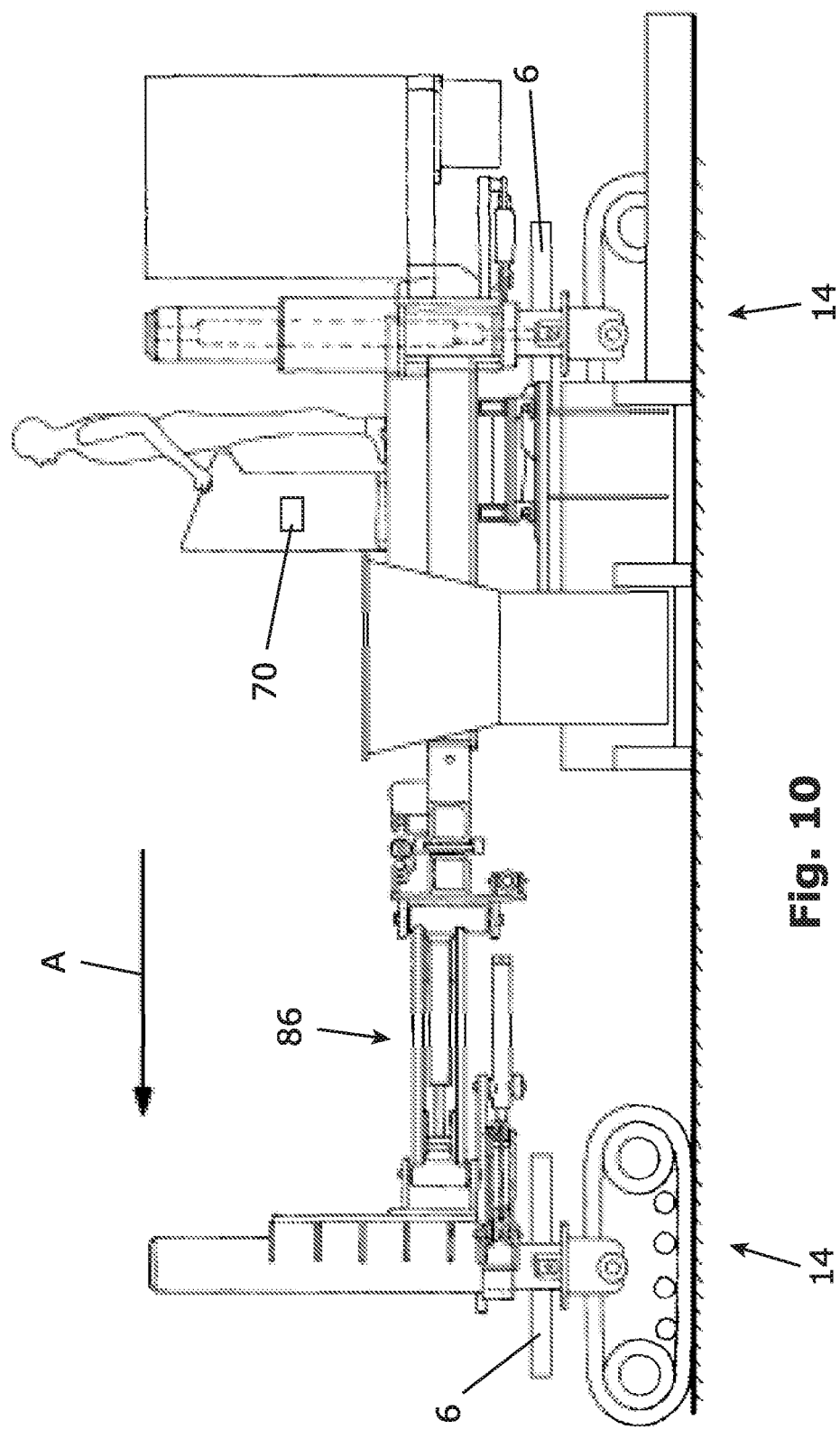

SELF-PROPELLED CONSTRUCTION MACHINE

BACKGROUND OF THE DISCLOSURE

Field of the Disclosure

The invention relates to a self-propelled construction machine.

Description of the Prior Art

Self-propelled construction machines, in particular slipform paving machines, are known, which comprise a machine frame and at least three travelling devices. Said travelling devices are each connected to the machine frame by means of lifting columns, wherein at least one of the at least three travelling devices is steerable by means of one each steering drive, wherein the respective steering drive comprises at least one first part, which is connected to the respective travelling device, and comprises one second part, which is connected to the respective lifting column.

Self-propelled construction machines may be, in particular, slipform paving machines, or also, for example, road milling machines, mining machines (surface miners), stabilizing machines or recycling machines.

Slipform paving machines serve the purpose of producing surfaces or profiles made of concrete. A slipform paving machine may comprise different working devices, for example, for producing a pavement made of concrete, wherein a concrete mold extending transversely across the pavement between the ground-engaging units may be used for forming the concrete. Profiles may also be created by means of a so-called side form arranged next to the ground-engaging units.

In self-propelled construction machines, in particular slipform paving machines, there is the increasing requirement for steering of the travelling devices by means of the steering drives to be effected very quickly, and for large steering angles to be made possible.

SUMMARY OF THE DISCLOSURE

It is therefore the object of the present invention to create a self-propelled construction machine, in particular slipform paving machine, in which steering is effected very quickly and features a large steering angle.

The present invention advantageously provides that the steering drive comprises at least one first toothed rack, wherein the first toothed rack is movable by means of at least one first linear drive means, wherein teeth of the at least one first toothed rack engage with teeth of at least one toothed wheel, and the toothed wheel is thus rotatable by means of the movement of the toothed rack.

The at least one first linear drive means has the advantage, compared to a worm drive, for example, that it permits quick adjustment of the steering angle. Moreover, the use of a toothed rack meshing with a toothed wheel has the advantage that, in this design, large steering angles are made possible.

According to one embodiment, the current steering angle setting or steering angle position, respectively, and/or the steering speed may be detected by means of sensors. The sensors may be used, for example, to detect the adjustment or adjusting movement, respectively, of the linear drive means.

The current steering angle setting or steering angle position, respectively, may be detected, for example, by means of a displacement sensor, which detects the adjusting movement of the linear drive means.

For this purpose, the relative position of a movable part of the linear drive means relative to a pivot point of the linear drive means may be detected, and the current steering angle setting deduced as a result of the geometry of the toothed rack and the toothed wheel.

Alternatively, the relationship between the relative position of the movable part of the linear drive means relative to a pivot point of the linear drive means and the steering angle may be determined empirically.

Furthermore, independent of the detection of the steering angle, such detection of the adjusting movement of the linear drive means has the advantage that, through detecting the change in the relative position of the movable part of the linear drive means relative to a pivot point of the linear drive means, the speed of the steering angle change is detected and monitored over time.

It is thus possible, in the case of intended large changes in the steering angle, to select a higher adjustment speed for the linear drive means and, in the case of small changes in the steering angle, to select a lower adjustment speed for the linear drive means for the purpose of increased precision.

The first linear drive means may be a first hydraulic or pneumatic drive means.

Alternatively, at least the first linear drive means may also be an electric drive means or any other linear drive means.

It is particularly preferred for the first linear drive means to comprise an integrated displacement sensor for the purpose of determining the adjustment position.

The present invention thus has the advantage that steering may be performed very quickly. Furthermore, there is also not the problem of damages caused by mechanical self-locking. In the state of the art, mechanical self-locking may occur, for example, in steering drives with worm gears. When a travelling device is slightly pivoted, for example, as a result of driving up against an edge, steering gears known from the state of the art cannot follow the movement due to self-locking, which may result in damages to the steering gear itself, to the ground-engaging unit or to a connecting element between the ground-engaging unit and steering gear. Since, in the present case, the first linear drive means is a hydraulic or pneumatic drive means, however, such mechanical self-locking does not occur. A first linear drive means that were an electric drive means would have the same advantage.

When using a hydraulic or pneumatic drive means, for example, a pressure relief valve may be provided in the hydraulic or pneumatic circuit. When a force acts on the hydraulic or pneumatic drive means, if the permissible pressure in the hydraulic or pneumatic circuit is exceeded, the pressure relief valve may open and therefore allow an evasive action of the hydraulic or pneumatic drive means. There is therefore no mechanical self-locking.

The at least one first hydraulic or pneumatic drive means may comprise at least one working chamber fillable with hydraulic or pneumatic medium.

A piston element movable in the first working chamber may be connected to the first toothed rack.

The toothed rack and the piston element may be integrally connected.

The at least one first working chamber may be part of a hydraulic cylinder.

The first part of the steering drive, which is connected to the respective travelling device, may comprise the at least one first linear drive means and the at least one first toothed rack, and the second part of the steering drive, which is connected to the respective lifting column, may comprise the respective toothed wheel of the steering drive, or, alternatively, the first part of the steering drive, which is connected to the respective travelling device, may comprise the at least one toothed wheel, and the second part of the steering drive, which is connected to the respective lifting column, may comprise the at least one first linear drive means and the at least one first toothed rack of the steering drive.

The toothed rack may be moved in a first and in a second direction of movement opposite to the first. In this design, the first linear drive means may move the toothed rack in the first direction of movement and in the second direction of movement opposite to the first. Alternatively, the first linear drive means may also only move the toothed rack in the first direction of movement. That the first linear drive means only moves the toothed rack in the first direction of movement does not imply that the toothed rack is only movable in a single direction of movement. As a basic principle, a movability of the first toothed rack in both directions of movement should preferably not be excluded.

In the case that the first linear drive means only moves the toothed rack in the first direction of movement, a further drive means may be provided for the movement in the second direction of movement. A second linear drive means with a second toothed rack, for example, is described below. As a basic principle, a movability of the first toothed rack in both directions of movement should preferably not be excluded.

The at least one first hydraulic or pneumatic drive means may comprise at least one second working chamber fillable with hydraulic or pneumatic medium.

The first hydraulic or pneumatic drive means may be designed in such a fashion that, by means of the first working chamber, the toothed rack is movable in the first direction of movement, and, by means of the second working chamber, the toothed rack is movable in the opposite second direction of movement.

The toothed wheel may be rotatable in a first direction of rotation by moving the first toothed rack in the first direction of movement. The toothed wheel may be movable in a second direction of rotation by moving the first toothed rack in the second direction of movement.

The first and the second working chambers may be arranged in two separate cylinders.

Alternatively, the first and the second working chambers may be arranged in a single cylinder and may be operatable in the manner of a double-acting hydraulic or pneumatic cylinder.

In the embodiment in which the first and the second working chambers are arranged in two separate cylinders, a second piston element may be provided that is movable in the second working chamber. Said second piston element movable in the second working chamber may likewise be connected to the first toothed rack, wherein the second piston element is preferably integrally connected to the first toothed rack.

The steering drive may comprise at least one second toothed rack, wherein the second toothed rack is movable by means of at least one second linear drive means, wherein the second toothed rack is preferably arranged parallel to the first toothed rack. The second toothed rack may likewise preferably engage with the toothed wheel and drive the toothed wheel.

Alternatively, the second toothed rack, which is movable by means of the at least second linear drive, may also engage with a further toothed wheel, which may be connected to the first toothed wheel or may be engaged with the first toothed wheel.

The toothed racks arranged parallel to one another may be arranged on opposite sides of the toothed wheel, and the teeth of the first and the second toothed racks may be facing each other.

The use of a first toothed rack with a first linear drive means and a second toothed rack with a second linear drive means is particularly advantageous, independent of the number of the toothed wheels used, as it is thus made possible to keep the kinematics for the adjustment of the steering angle free from play at all times.

This may be achieved in particular as a result of the first and the second linear drive means being controlled in such a fashion that the force applied by the first toothed rack to the toothed wheel engaged with the first toothed rack is in opposition to the force that is applied by the second toothed rack to the toothed wheel engaged with the second toothed rack. Consequently, the toothed wheel or the steering drive assembly carrying the plurality of toothed wheels is locked in place by means of opposite movements of the linear drive means, thus ensuring the freedom from play in the steering drive.

The second linear drive means may, in basic principle, be designed in the same manner as the first linear drive means. The descriptions relating to the first linear drive means and the advantages mentioned thus also apply to the second linear drive means.

The second linear drive means may be a second hydraulic or pneumatic drive means.

Alternatively, at least the second linear drive means may also be an electric drive means or any other linear drive means.

In the second linear drive means, the current steering angle setting or steering angle position, respectively, and/or the steering speed may also be detected by means of sensors. The sensors may detect, for example, the adjustment or adjusting movement, respectively, of the linear drive means.

The current steering angle setting or steering angle position, respectively, may be detected, for example, by means of a displacement sensor, which detects the adjusting movement of the linear drive means.

For this purpose, the relative position of a movable part of the linear drive means relative to a pivot point of the linear drive means may be detected, and the current steering angle setting deduced as a result of the geometry of the toothed rack and the toothed wheel.

Alternatively, the relationship between the relative position of the movable part of the linear drive means relative to a pivot point of the linear drive means and the steering angle may be determined empirically.

The at least one second hydraulic or pneumatic drive means may comprise at least one third working chamber fillable with hydraulic or pneumatic medium.

The third working chamber is the third working chamber only for the purpose of linguistic differentiation from the first and the second working chambers; however, the third working chamber is the first working chamber of the second drive means. The first hydraulic or pneumatic drive means may therefore comprise only one working chamber, namely, the first working chamber, and the second hydraulic or pneumatic drive means may also comprise only one working chamber, namely, the third working chamber. In this case, the toothed wheel may be moved in the first direction of rotation by means of the first hydraulic or pneumatic drive means, and may be moved in the second direction of rotation by means of the second hydraulic or pneumatic drive means.

In addition to the third working chamber, the at least one second hydraulic or pneumatic drive means may comprise at least one further fourth working chamber fillable with hydraulic and pneumatic medium.

The fourth working chamber is also the fourth working chamber only for reasons of linguistic distinction. The fourth working chamber is, actually, the second working chamber of the second drive means.

The third and fourth working chambers may be arranged in two separate cylinders or in a single cylinder. When arranged in a single cylinder, the cylinder may be operatable in the manner of a double-acting hydraulic or pneumatic cylinder.

The first and second toothed racks arranged on opposite sides may always be movable in opposite directions of movement during operation.

Provided that the first and the second working racks are arranged on the same side of the toothed wheel, and the second toothed rack engages with a further toothed wheel arranged parallel to the first toothed wheel, the first and the second toothed racks may each also be movable in the same direction of movement.

However, in this arrangement, as described above, a movability of the first and second toothed racks in both directions of movement should preferably not be excluded in order to ensure freedom from play in the steering drive.

The first and the second parts of the steering drive may be rotatable relative to one another about at least 180°, preferably at least 220°, particularly preferably at least 270°.

According to the present invention, a self-propelled construction machine may be provided, which comprises four travelling devices and a control device for controlling the respective steering drives of the travelling devices.

Different steering modes may be adjustable in the control device. The steering drives may be controllable as a function of the different steering modes. In the different steering modes, the steering drives may preferably be steerable in a mutually coordinated manner.

The following steering modes may be adjustable, for example, in the control device:
a. "front-wheel steering" steering mode, wherein the two front travelling devices may be coordinated similar to a front-wheel steering system of a passenger vehicle;
b. "four-wheel steering" steering mode, wherein all four travelling devices may be coordinated in accordance with the Ackermann condition;
c. "crab steering" steering mode, wherein all travelling devices are adjusted to the same steering angle with the same amount in the same direction;
d. "transport travel" steering mode, in which all travelling devices are adjusted to 90° to the direction of operation for the purpose of transport travel in the longitudinal direction of the machine;
e. "swing over steering" steering mode, in which the travelling devices are steered in a coordinated manner by means of the control device as described in EP 2 955 272 A1 (U.S. Pat. No. 9,388,537);
f. "telescope over steering" steering mode, in which the travelling devices are steered in a coordinated manner by means of the control device as described in EP 2 955 273 A1 (U.S. Pat. No. 9,388,538).

BRIEF DESCRIPTION OF THE DRAWINGS

In the following, one embodiment of the invention is explained in greater detail with reference to the drawings.

The following is shown schematically:
FIG. 10 shows a self-propelled construction machine 1 comprising 4 travelling devices.

DETAILED DESCRIPTION

Figure 1:
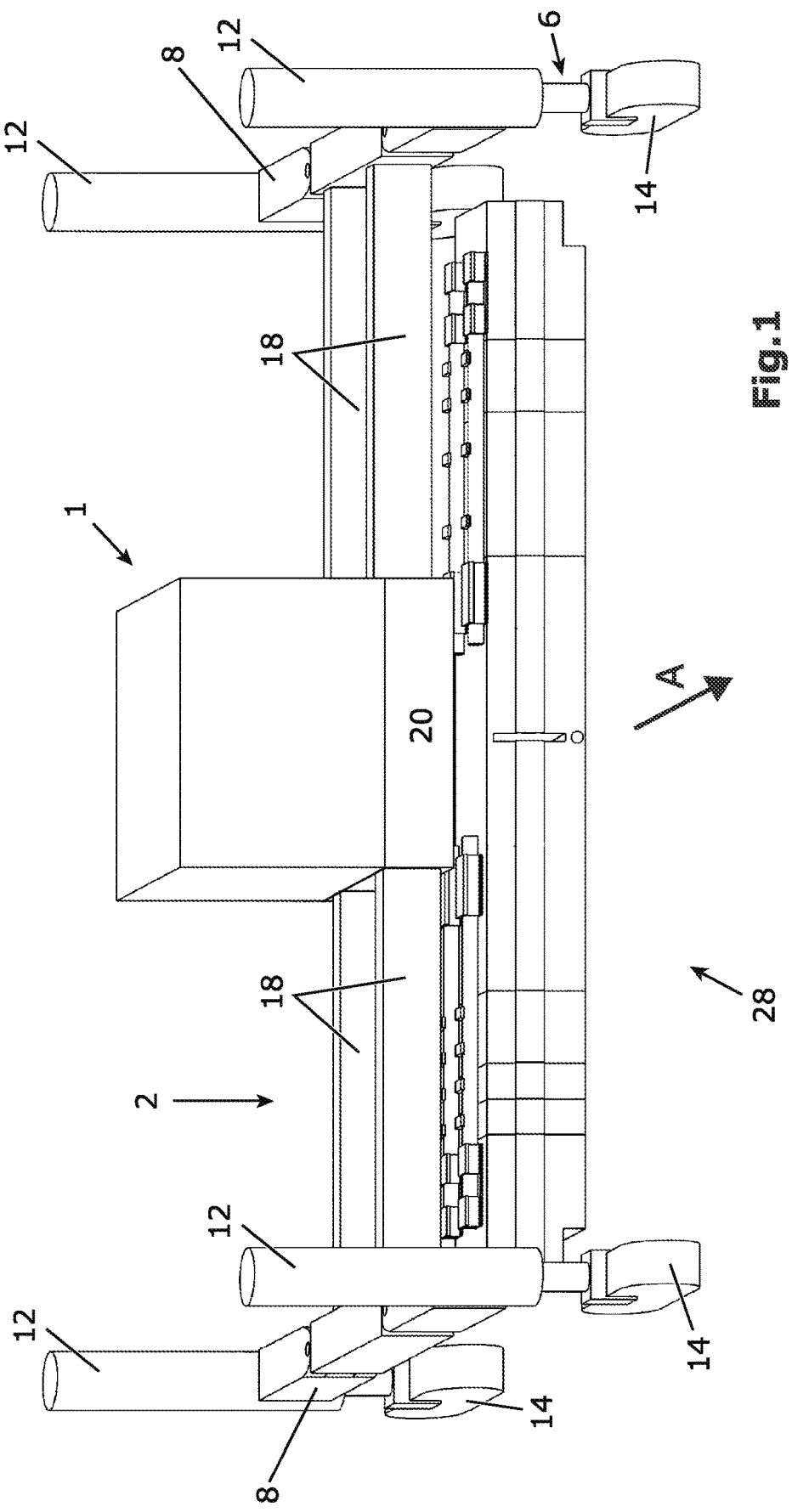
FIG. 1 a self-propelled construction machine,
FIG. 2 a first view of the steering drive,
FIG. 3 a further view of the steering drive,
FIG. 4 a hydraulic diagram of the embodiment according to FIGS. 2 and 3,
FIG. 5 a double-acting hydraulic cylinder,
FIG. 6 a side view of the steering drive when installed.

FIG. 1 shows a self-propelled construction machine 1. In the embodiment depicted, the self-propelled construction machine 1 is a slipform paving machine. The construction machine 1 depicted comprises a machine frame 2 and at least three travelling devices 14. The travelling devices 14 may also be referred to as ground engaging units 14. The ground engaging units 14 may be crawler tracks or wheels. The construction machine 1 depicted comprises four travelling devices 14, one of which is not visible in FIG. 1, however, due to the perspective.

The machine frame 2 comprises longitudinal members 8 extending parallel to the direction of operation A, and transverse members 18 extending transverse to the direction of operation A. The transverse members 18 may be telescopable as shown in the embodiment depicted. The telescopable transverse members 18 extending transverse to the direction of operation A may adjust the working width of the construction machine 1 designed as a slipform paving machine. The transverse members 18 may be mounted on a basic frame 20.

At the front and rear ends of the longitudinal members 8, travelling devices 14 may each be connected to the machine frame 2 by means of lifting columns 12, and a mold device 28 may furthermore be arranged underneath the basic frame 20.

The self-propelled construction machine 1 does not have to take the form of a slipform paving machine, however, but may also take the form of a road milling machine or surface mining machine, or stabilizing machine or recycling machine. It is only necessary for steering drives for the travelling devices 14 to be provided in each case.

In the embodiment depicted, at least two travelling devices 14 may be steerable by means of one each steering drive 6, wherein the respective steering drive 6 comprises at least one first part 10, which is connected to the respective travelling device 14, and one second part 16, which is connected to the respective lifting column 12.

Figure 2:
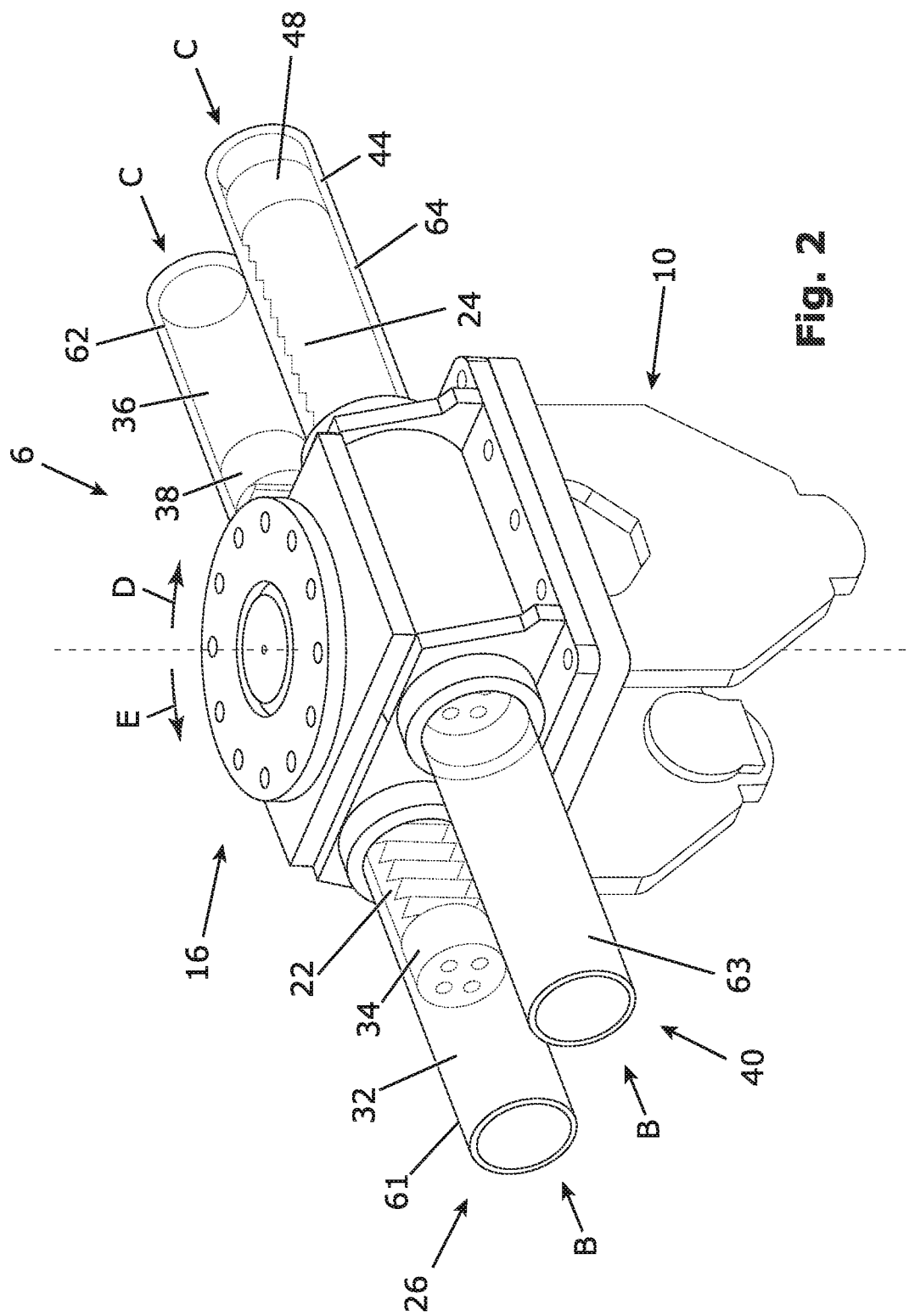
Figure 3:
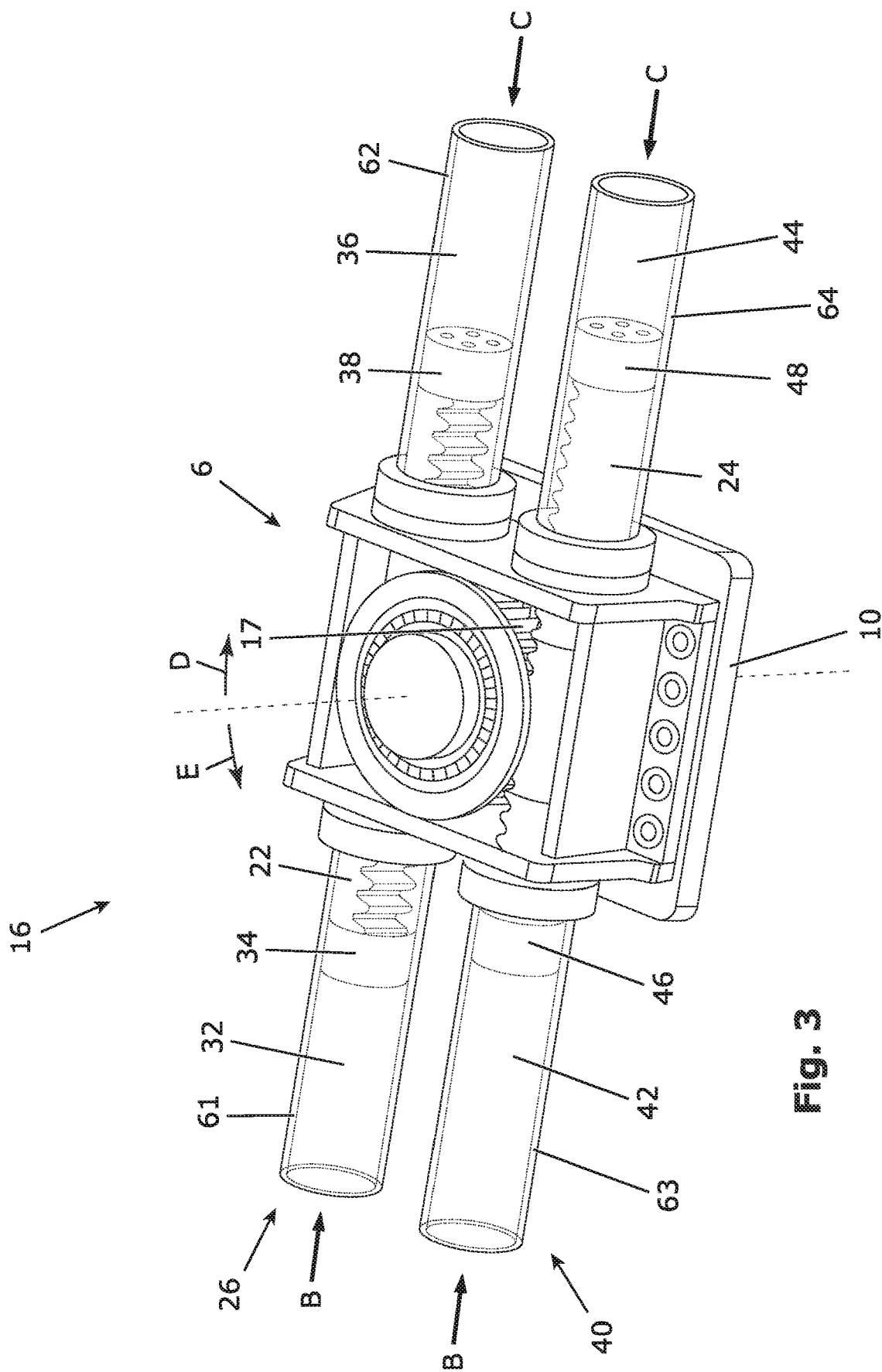

FIGS. 2 and 3 show a steering drive 6. The steering drive 6 comprises a first part 10, which is connected to the respective travelling device 14, and a second part 16, which is connected to the respective lifting column 12.

The steering drive 6 comprises at least one first toothed rack 22, which is movable by means of at least one first linear drive means 26. The first linear drive means 26 may also be referred to as a first linear drive 26. The teeth of the at least one toothed rack 22 engage with teeth of at least one toothed wheel 17, so that the toothed wheel 17 is rotatable by means of the movement of the toothed rack 22.

The toothed wheel 17 may therefore be rotated, and the travelling device 14 rotated or steered, respectively, relative to the lifting column 12 by moving the toothed rack 22 by means of the at least one first linear drive means 26. The rotation of the toothed wheel 17 is a relative rotation relative to the first part 10 and the respective travelling device 14. In the embodiment, the travelling device 14 rotates relative to the toothed wheel 17, and therefore relative to the respective lifting column 12.

The depicted first linear drive means 26 is a first hydraulic drive means which may also be referred to as a first hydraulic drive.

The first linear drive means 26 may move the first toothed rack 22 in a first direction of movement B, and in a second direction of movement C opposite to the first.

Alternatively, the first linear drive means 26 could also be a pneumatic or also an electric drive means, which may also be referred to as a pneumatic drive or an electric drive.

The at least one first hydraulic drive means 26 comprises at least one first working chamber 32 fillable with hydraulic medium. A piston element 34 is arranged in the first working chamber 32, which is connected to the first toothed rack 22 and is movable in the working chamber 32. The piston element 34 is moved, and thus the first toothed rack 22 is moved in the first direction of movement B, by means of introducing the hydraulic medium into the working chamber 32. The first hydraulic drive means 26 furthermore comprises a second hydraulic working chamber 36. A movable second piston element 38 is likewise arranged in the second working chamber 36, which is connected to the other end of the toothed rack 22. The piston element 38 may also be moved, and thus the toothed rack 22 be moved in the second direction of movement C, by means of filling a hydraulic working medium into the second working chamber.

In the embodiment depicted, the first and second working chambers 32, 36 are arranged in two separate cylinders 61, 62.

In the present embodiment, a second linear drive means 40 is provided in addition to the first linear drive means 26.

In the present case, said second linear drive means 40 is likewise a second hydraulic drive means, which may move a second toothed rack 24. The second toothed rack 24 is preferably arranged parallel to the first toothed rack 22, and the second toothed rack 24 likewise engages with the toothed wheel 17. In the embodiment depicted, the second toothed rack 24 is arranged on the opposite side, and the teeth of the first toothed rack 22 and the second toothed rack 24 are preferably facing each other.

Alternatively, a further toothed wheel could also be provided, which is arranged parallel to the first toothed wheel 17 and is connected to the axis of rotation. In this case, the teeth of the second toothed rack could engage with the second toothed wheel, and the second toothed rack could also be arranged on the same side as the first toothed rack.

The second hydraulic drive means 40 comprises a third working chamber 42 and a fourth working chamber 44. A piston element 46 is arranged in the third working chamber 42, which is connected to a first end of the second toothed rack 24. A piston element 48 is arranged in the fourth working chamber 44, which is connected to the second end of the second toothed rack 24. The second toothed rack 24 may be moved in a first direction of movement B, or in a second direction of movement C opposite to the first, by means of filling a hydraulic medium into the third chamber 42 or the fourth chamber 44.

In the embodiment depicted, the third and fourth working chambers 42, 44 are arranged in two separate cylinders 63, 64.

FIG. 3 shows the toothed wheel 17 and the engagement of the first and second toothed racks 22, 24 with the toothed wheel.

The toothed wheel 17 may be rotated in the first direction of rotation D by moving the first toothed rack 22 in the first direction of movement B. The toothed wheel 17 may be rotated in the second direction of rotation E opposite to the first direction of rotation D by moving the first toothed rack 22 in the second direction of movement C.

The toothed wheel 17 may be rotated in the second direction of rotation E by moving the second toothed rack 24 in the first direction of movement B. The toothed wheel 17 may be rotated in the first direction of rotation D by moving the second toothed rack 24 in the second direction of movement C.

Figure 4:
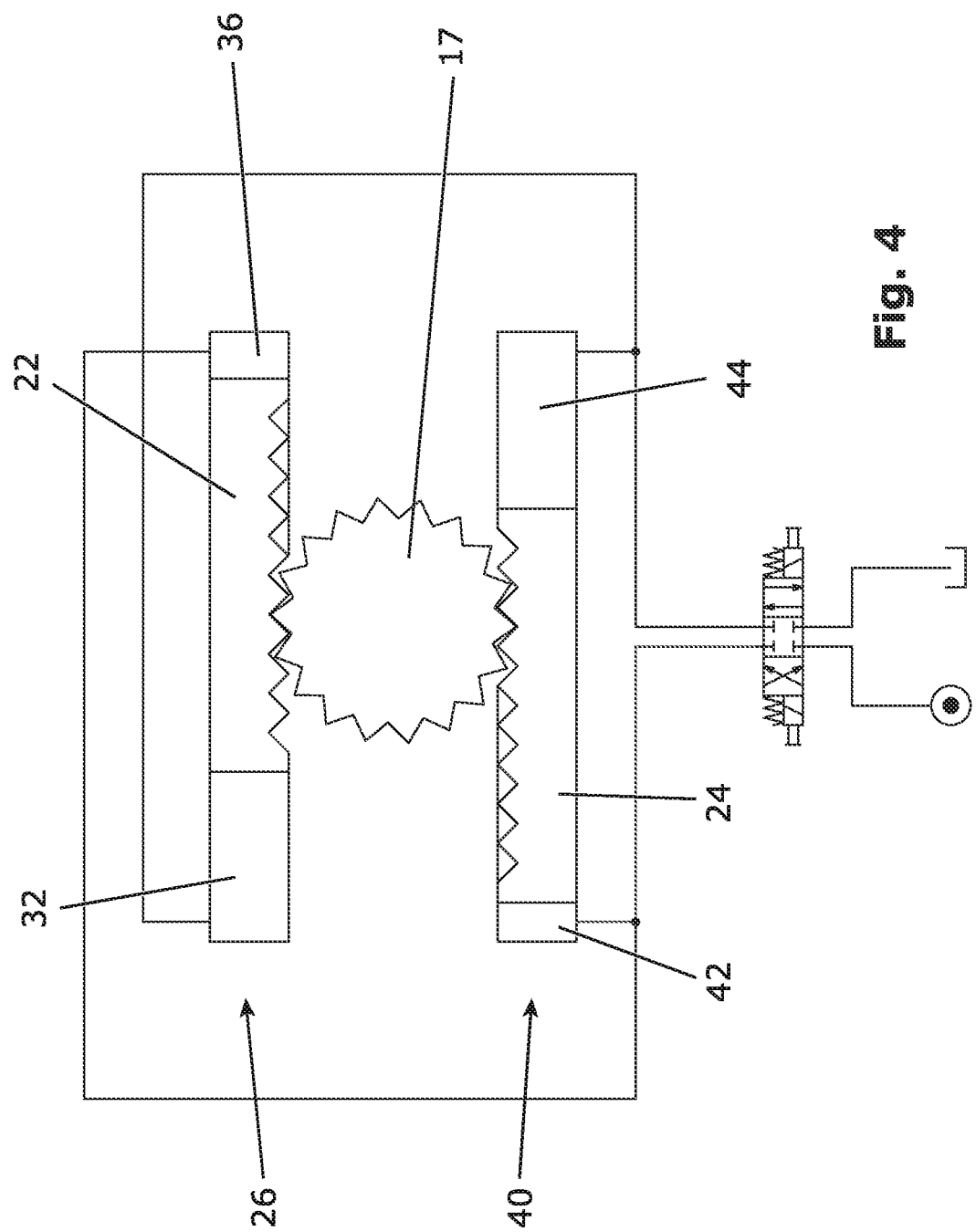

FIG. 4 shows a hydraulic diagram of the embodiment according to FIGS. 2 and 3. It is apparent that the hydraulic drive means is introduced either into the first and fourth working chambers, or into the second and third working chambers.

Alternatively, the first hydraulic drive means and/or the second hydraulic drive means may also be built in such a fashion that the first and the second working chambers or also the third and fourth working chambers are each arranged in a single cylinder. In this case, the first and/or second hydraulic drive means would each operate as double-acting hydraulic cylinders.

Figure 5:
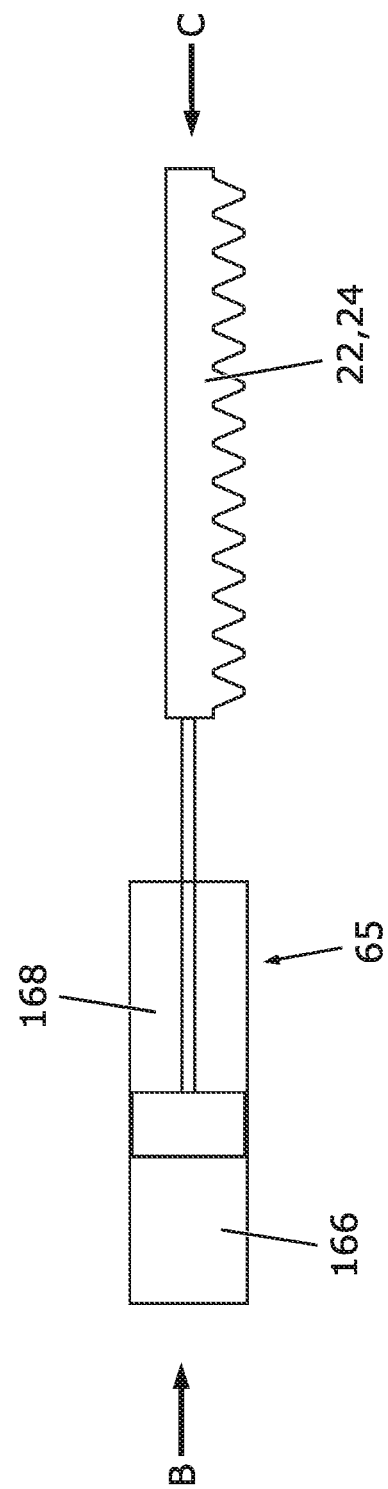

A respective schematic double-acting hydraulic cylinder 65 is shown in FIG. 5. In this case, the piston rod is connected either to the first toothed rack 22 or to the second toothed rack 24. This is only a purely schematic illustration. The respective toothed rack 22 or 24, respectively, would then engage with the toothed wheel 17 accordingly, as shown in FIG. 2 or 3. The piston rod 22, 24 is moved in the first direction of movement B by filling a first chamber 166 of the double-acting hydraulic cylinder with hydraulic medium; the piston rod is moved in the second direction of movement C by filling the second chamber 168 of the double-acting hydraulic cylinder.

FIG. 6 illustrates once again how the steering drive 6, with the second part 16, is connected to the lifting column 12.

Figure 6:
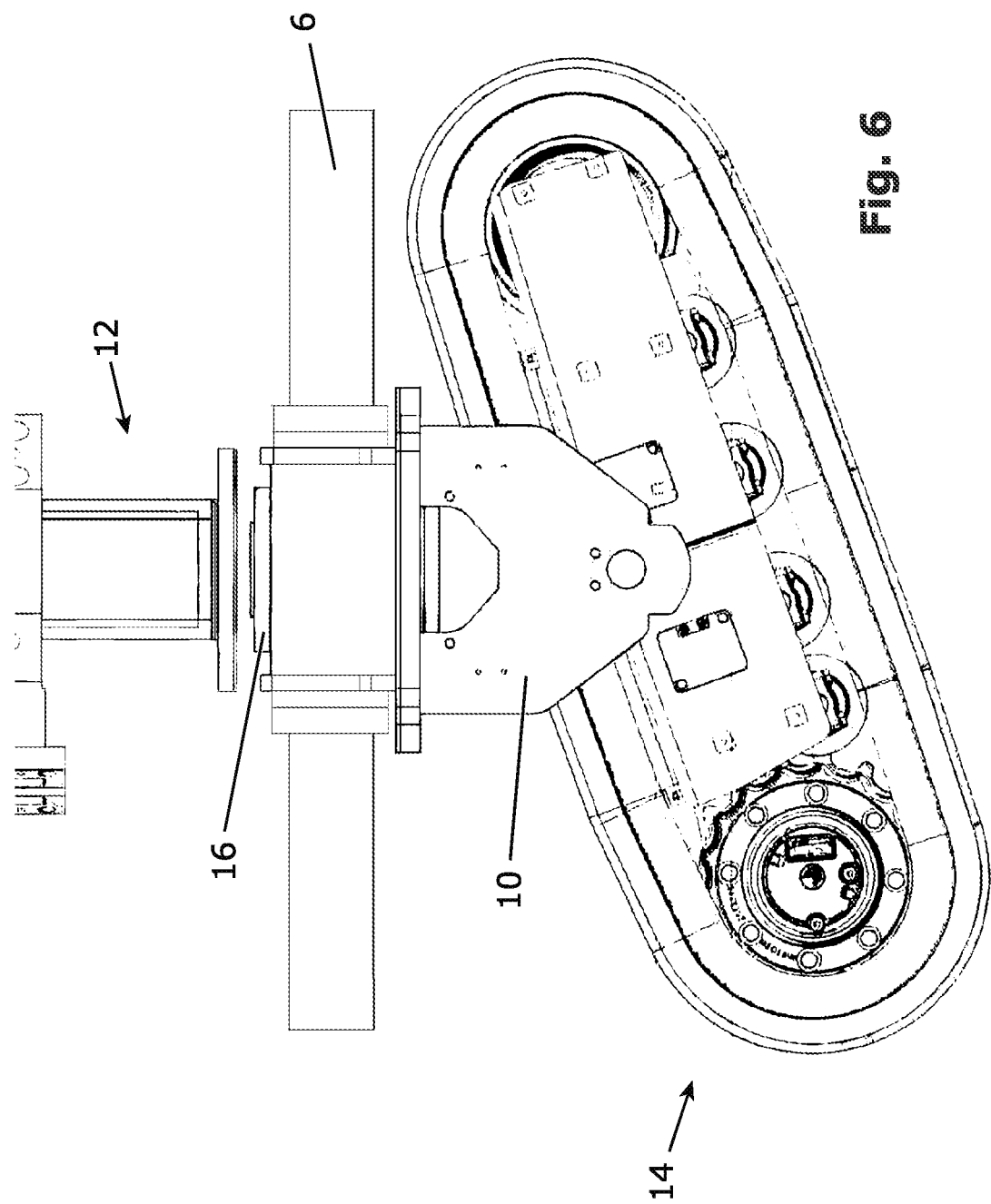

However, a spacing is shown in FIG. 6 between the second part 16 and the lifting column 12. This has only been included for the purpose of clarity. There would be no spacing in the actual embodiment, of course, and the second part 16 would be directly connected to the lifting column 12. The first part 10 is connected to the travelling device 14. The steering drive 6 could also be installed and fastened in exactly the opposite fashion, however, so that the first part of the steering drive, which is connected to the respective travelling device, comprises the at least one toothed wheel 17, and the second part 16 of the steering drive 6, which is connected to the respective lifting column 12, comprises the at least one first linear drive means 26 and the at least one first toothed rack 22, and, if in place, also the second drive means 40 and the second toothed rack 24.

Figure 7:
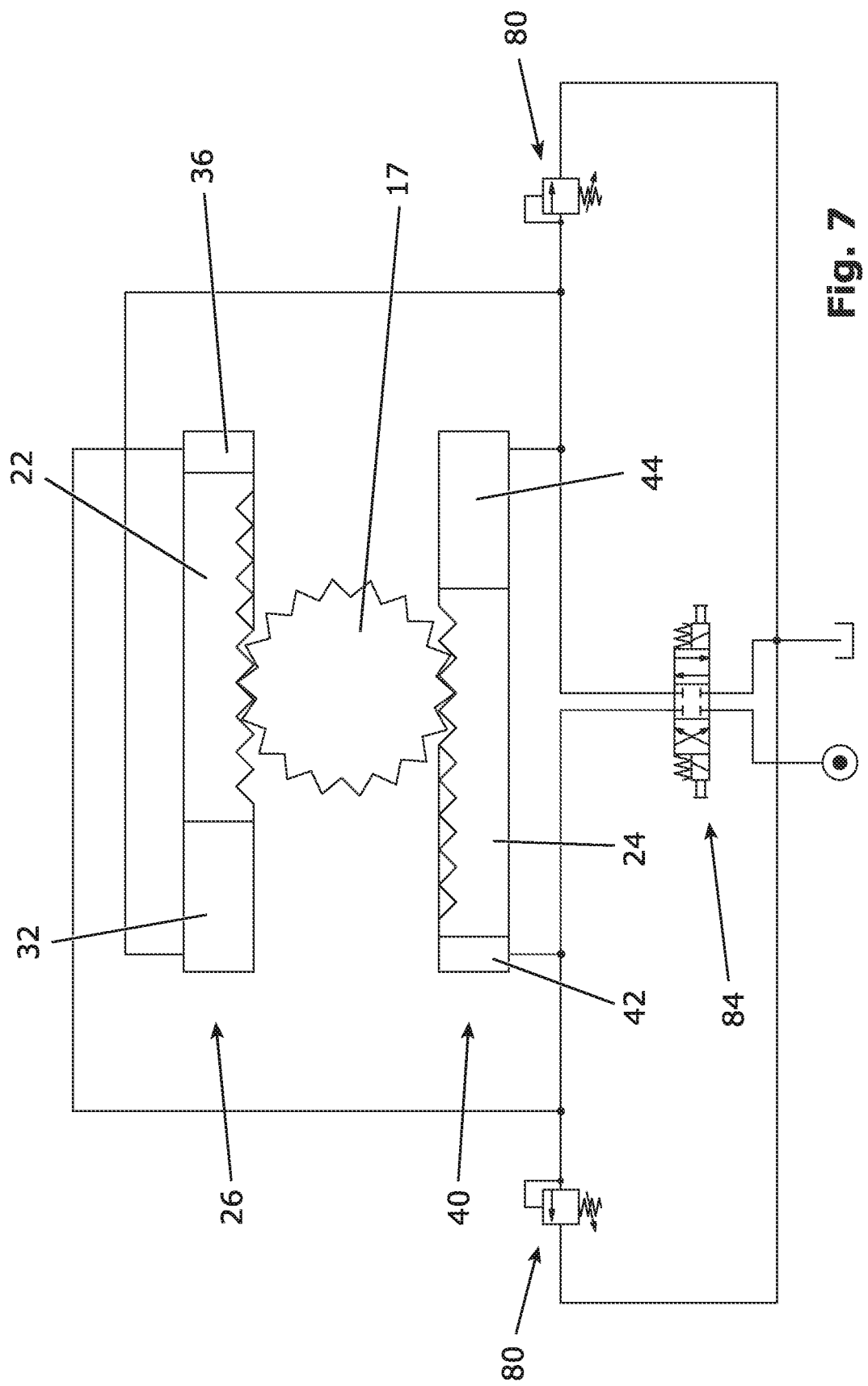
FIG. 7 shows a further hydraulic diagram of an embodiment.

FIG. 7 shows a further hydraulic diagram. This is different from the one according to FIG. 4 in that pressure relief valves 80 are provided as overload protection. If there is an excessive increase in pressure because, for example, a travelling device drives up sideways against a curb.

Figure 8:
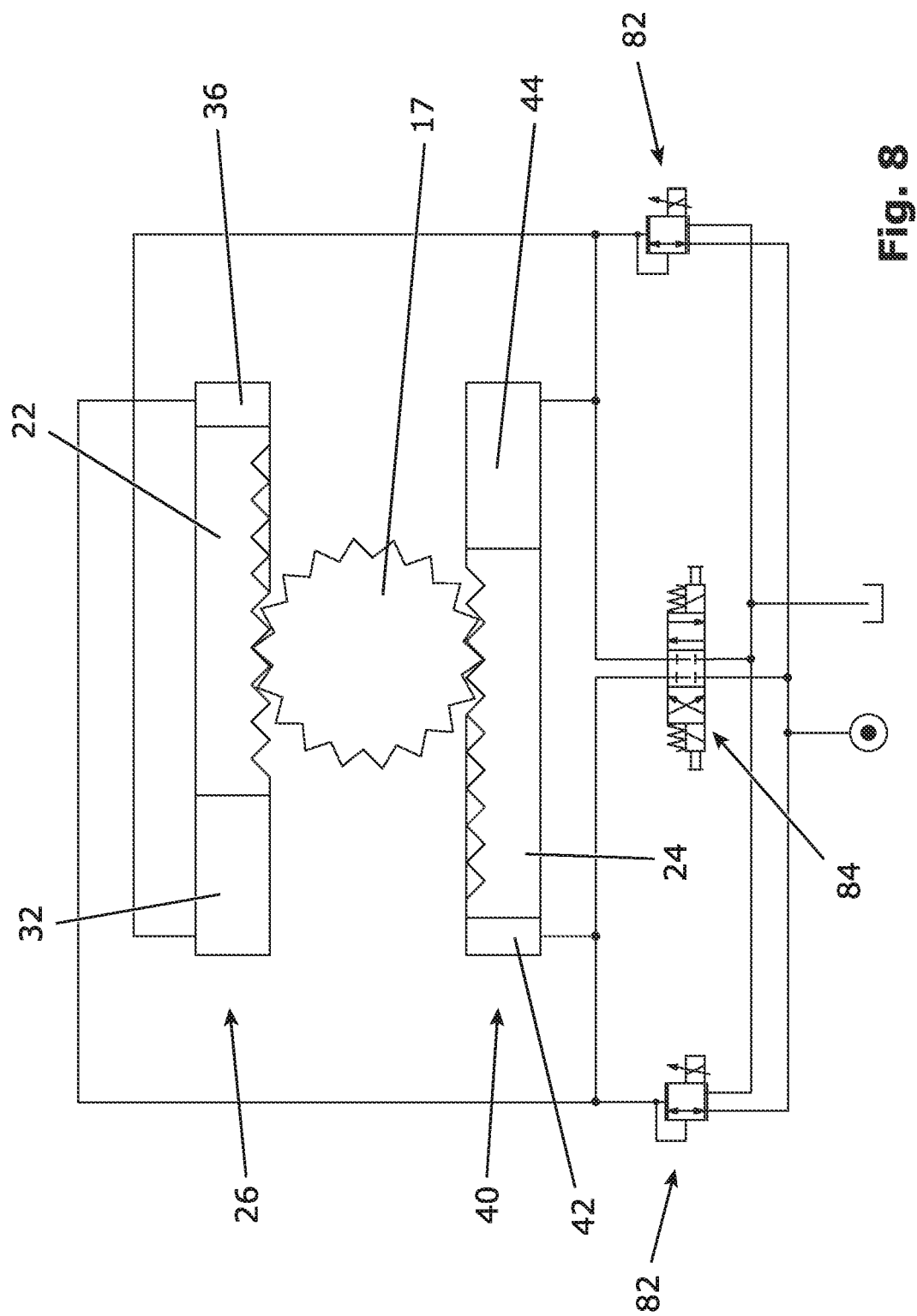
FIG. 8 shows a further hydraulic diagram of an embodiment.

FIG. 8 shows a further hydraulic diagram. This is different from the one according to FIG. 4 in that pressure reducing valves 82 are provided. Pressure reducing valves are electrically proportionally adjustable. The pressure reducing valves 82 allow a difference in pressure between the two sides to be adjusted by means of different control on the two sides. It may thus be accomplished that the force applied by the first toothed rack 22 to the toothed wheel 17 engaged with the first toothed rack 22 is in opposition to the force that is applied to the toothed wheel 17 by the second toothed rack 24. Consequently, the toothed wheel 17 of the steering drive is locked in place by means of opposite movements, thus ensuring the freedom from play in the steering drive.

However, in the present embodiment, the steering movement is essentially controlled by the directional control valve 84.

The pressure reducing valves 82 may furthermore also serve as pressure relief valves and allow an evasive action in the case of a maximum force being exceeded, similar to the pressure relief valves 80 according to FIG. 7.

Figure 9:
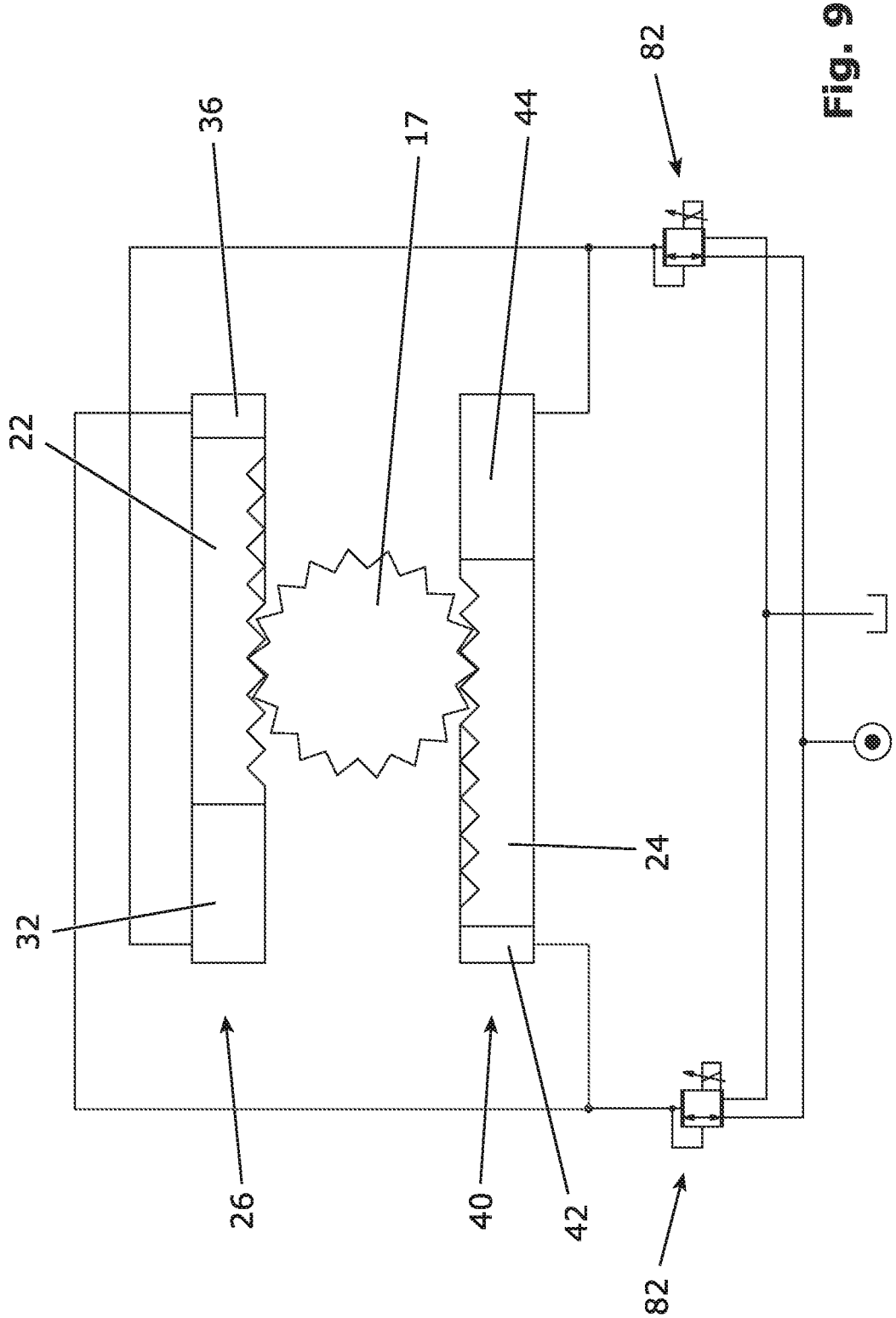
FIG. 9 shows a further hydraulic diagram of an embodiment.

FIG. 9 shows an embodiment that is similar to the one according to FIG. 8 but is different in that no directional control valve 84 is provided. In this case, the steering movement is also controlled by means of the pressure reducing valves 82.

FIG. 10 shows a self-propelled construction machine 1, which comprises 4 travelling devices 14 and a control device 70 for controlling the respective steering drives 6 of the travelling devices 14.

Different steering modes may be adjustable in the control device 70. The steering drives 6 may be controllable as a function of the different steering modes. In the different steering modes, the steering drives 6 may preferably be steerable in a mutually coordinated manner.

The following steering modes may be adjustable, for example, in the control device 70:
a. "front-wheel steering" steering mode, wherein the two front travelling devices 14 may be coordinated similar to a front-wheel steering system of a passenger vehicle;
b. "four-wheel steering" steering mode, wherein all four travelling devices 14 may be coordinated in accordance with the Ackermann condition;
c. "crab steering" steering mode, wherein all travelling devices 14 are adjusted to the same steering angle with the same amount in the same direction;
d. "transport travel" steering mode, in which all travelling devices 14 are adjusted to 90° to the direction of operation A for the purpose of transport travel in the longitudinal direction of the machine
e. "swing over steering" steering mode, in which the travelling devices are steered in a coordinated manner by means of the control device 70 as described in EP 2 955 272 A1 (U.S. Pat. No. 9,388,537);
f. "telescope over steering" steering mode, in which the travelling devices are steered in a coordinated manner by means of the control device 70 as described in EP 2 955 273 A1 (U.S. Pat. No. 9,388,538).

In the "swing over steering" steering mode, the travelling devices are steered in a coordinated manner by means of the control device 70 so as to make it possible that each of the swing legs 86, in response to steering the travelling devices 14 by means of the respective steering drive 6, rotates relative to the machine frame while the machine is driven across the ground surface by the travelling devices 14.

In the "telescope over steering" steering mode, a machine frame may in principle be used, which is laterally extendable. Furthermore, a frame locking device may be provided, which is designed for the selective locking and unlocking of the machine frame in such a fashion that the machine frame is not laterally extendable with the frame locking device being locked, and the machine frame is laterally extendable with the frame locking device being unlocked. In the case of an unlocked frame locking device, the travelling devices may be steered in a coordinated manner by means of the control device 70 so as to make it possible that steering of at least one of the travelling devices provides a lateral force for adjusting the width of the machine frame while the construction machine is moved across the ground surface by the travelling devices 14a, 14b with the frame locking device being unlocked.

The invention claimed is:

1. A self-propelled construction machine, comprising:
   a machine frame;
   at least three ground engaging units for supporting the machine frame from a ground surface;
   at least three lifting columns, each lifting column connecting an associated one of the ground engaging units to the machine frame; and
   at least one steering drive configured to steer at least one of the ground engaging units, the steering drive including a first part connected to the ground engaging unit and a second part connected to the associated lifting column, the steering drive further including:
   at least one toothed wheel;
   at least one first toothed rack including teeth engaged with teeth of the toothed wheel; and
   at least one first linear drive configured to move the first toothed rack to rotate the toothed wheel.

2. The self-propelled construction machine of claim 1, wherein:
   the first linear drive is a hydraulic or pneumatic drive including at least one first working chamber fillable with hydraulic or pneumatic medium.

3. The self-propelled construction machine of claim 2, wherein:
   the first linear drive includes a piston movable in the first working chamber, the piston being connected to the first toothed rack.

4. The self-propelled construction machine of claim 1, wherein:
   the first part of the steering drive includes the first linear drive and the toothed rack, and the second part of the steering drive includes the toothed wheel; or
   the first part of the steering drive includes the toothed wheel, and the second part of the steering drive includes the first linear drive and the toothed rack.

5. The self-propelled construction machine of claim 1, wherein:
   the first toothed rack is movable by the first linear drive in a first direction of movement and in a second direction of movement opposite to the first direction of movement.

6. The self-propelled construction machine of claim 1, wherein:
   the first linear drive is a hydraulic or pneumatic drive including at least one first working chamber fillable with hydraulic or pneumatic medium and at least one second working chamber fillable with hydraulic or pneumatic medium.

7. The self-propelled construction machine of claim 6, wherein:
   the first and second working chambers are arranged in two separate cylinders.

8. The self-propelled construction machine of claim 7, wherein:
   the first linear drive includes a first piston movable in the first working chamber and a second piston movable in the second working chamber, the first and second pistons being connected to the first toothed rack.

9. The self-propelled construction machine of claim 8, wherein:
the first and second pistons are integrally connected to the first toothed rack.

10. The self-propelled construction machine of claim 6, wherein:
the first and second working chambers are arranged in a single cylinder and are operable as a double-acting hydraulic or pneumatic cylinder.

11. The self-propelled construction machine of claim 1, wherein the steering drive further includes:
at least one second toothed rack including teeth engaged with teeth of the toothed wheel; and
at least one second linear drive configured to move the second toothed rack to rotate the toothed wheel.

12. The self-propelled construction machine of claim 11, wherein:
the first and second toothed racks are arranged parallel to one another on opposite sides of the toothed wheel, and the teeth of the first and second toothed racks face each other.

13. The self-propelled construction machine of claim 11, wherein:
the first and second linear drives are each a hydraulic or pneumatic drive including at least one working chamber fillable with hydraulic or pneumatic medium.

14. The self-propelled construction machine of claim 13, wherein:
the first and second linear drives each include a further working chamber fillable with hydraulic or pneumatic medium.

15. The self-propelled construction machine of claim 14, wherein:
the working chambers of each of the first and second linear drives are arranged in two separate cylinders.

16. The self-propelled construction machine of claim 14, wherein:
the working chambers of each of the first and second linear drives are arranged in a single cylinder operable as a double-acting hydraulic or pneumatic cylinder.

17. The self-propelled construction machine of claim 1, further comprising:
at least one sensor arranged on the first linear drive and configured to sense a current steering angle and/or a current steering speed of the ground engaging unit connected to the steering drive.

18. The self-propelled construction machine of claim 17, wherein:
the sensor is a displacement sensor configured to detect movement of the first linear drive.

19. A self-propelled construction machine, comprising:
a machine frame;
first, second and third ground engaging units for supporting the machine frame from a ground surface;
first, second and third lifting columns connecting the machine frame to the first, second and third ground engaging units, respectively; and
a steering drive configured to steer the first ground engaging unit, the steering drive including:
a toothed wheel connected to one of the first ground engaging unit and the first lifting column;
a toothed rack including teeth engaged with teeth of the toothed wheel, the toothed rack being connected to the other of the first ground engaging unit and the first lifting column; and
a linear drive configured to move the toothed rack to rotate the toothed wheel.

20. The self-propelled construction machine of claim 19, wherein:
the linear drive includes a hydraulic cylinder including an integrated displacement sensor.

* * * * *